(12) United States Patent
Bae

(10) Patent No.: US 6,795,718 B2
(45) Date of Patent: *Sep. 21, 2004

(54) HEADSET COMMUNICATION DEVICE

(75) Inventor: Hyon S. Bae, Burlingame, CA (US)

(73) Assignee: Youngbo Engineering, Inc., Cheonan-Shi (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/077,448

(22) Filed: Feb. 15, 2002

(65) Prior Publication Data

US 2003/0157972 A1 Aug. 21, 2003

(51) Int. Cl.$^7$ ............................................. H04M 1/00
(52) U.S. Cl. ....................... 455/575.2; 455/569.1; 455/575.1; 455/41.2; 455/550.1; 379/428.2; 379/430; 379/433.02
(58) Field of Search .................. 455/568, 568.1, 455/41.1–41.2, 66, 550.1, 575.1, 569.1, 550, 575.2, 344, 347, 350; 379/420.01–420.04, 428.01–428.02, 430, 433.01, 433.02, 433.08; D14/204–206, 223–224, 248–249

(56) References Cited

U.S. PATENT DOCUMENTS

| | | | |
|---|---|---|---|
| 4,558,178 A | 12/1985 | Yasuda et al. | |
| 4,882,745 A | 11/1989 | Silver | |
| 5,113,428 A | 5/1992 | Fitzgerald | |
| 5,191,602 A | 3/1993 | Regen et al. | |
| 5,426,689 A | 6/1995 | Griffith et al. | |
| 5,557,653 A | 9/1996 | Paterson et al. | |
| 5,586,176 A | 12/1996 | Peck | |
| 5,590,417 A | 12/1996 | Rydbeck | |
| 5,596,638 A | 1/1997 | Paterson et al. | |
| 5,613,222 A | 3/1997 | Guenther | |
| 5,721,775 A | 2/1998 | Leifer | |
| 5,745,859 A | 4/1998 | Takenaka | |
| 5,757,944 A | 5/1998 | Jensen et al. | |
| 5,787,166 A | 7/1998 | Ullman | |
| 5,926,532 A | 7/1999 | Peck | |
| 5,943,627 A * | 8/1999 | Kim et al. | 455/569.1 |
| 5,978,689 A | 11/1999 | Tuoriniemi et al. | |
| 5,991,645 A | 11/1999 | Yuen et al. | |
| 6,006,115 A | 12/1999 | Wingate | |
| 6,097,809 A | 8/2000 | Lucey et al. | |
| 6,101,260 A | 8/2000 | Jensen et al. | |
| 6,104,824 A * | 8/2000 | Ito | 381/381 |
| 6,130,953 A | 10/2000 | Wilton et al. | |
| 6,229,893 B1 | 5/2001 | Chen | |
| 6,230,029 B1 * | 5/2001 | Hahn et al. | 455/575.2 |
| 6,252,970 B1 | 6/2001 | Poon et al. | |
| 6,256,386 B1 | 7/2001 | Phillips | |
| 6,269,259 B1 * | 7/2001 | Lai | 455/569.1 |
| 6,396,935 B1 | 5/2002 | Makkonen | |
| 2003/0156729 A1 * | 8/2003 | Bae | 381/370 |

* cited by examiner

*Primary Examiner*—Vivian Chin
*Assistant Examiner*—Tuan A Tran
(74) *Attorney, Agent, or Firm*—Jacobson Holman PLLC (57) ABSTRACT

A headset is described for use in connection with either mobile telephones, conventional landline telephones or personal computers. When used with wireless applications, the headset is housed in a generally elongated casing having an ear bud, having a speaker therein, and a battery pack extending therefrom which are used in conjunction with one another to secure the headset against a user's ear. The battery pack includes a lip that is designed to cradle the helix of a user's ear against the casing and is positioned distal of the ear bud such that the battery pack is located behind a user's ear when the headset is in its operating position. The battery pack and the ear bud are further positioned on the casing to equally distribute the weight of the headset about the ear bud and prevent unnecessary movement of the headset about ear during operation.

27 Claims, 6 Drawing Sheets

HEADSET COMMUNICATION DEVICE

BACKGROUND OF THE INVENTION

1. Field of the Invention

The present invention generally relates to a telecommunications system, and more particularly, to a headset for use primarily in connection with a wireless application.

2. Description of the Related Art

With the increased popularity and widespread acceptance of cellular communication, many individuals with cellular telephones have increased the use of their phones while performing multiple tasks, including using their phones while walking or driving. In the case of driving while using the phone, a user typically holds the receiving unit against his or her ear, which increases the likelihood of traffic accidents since only one hand is available for driving. To help reduce the risk of traffic accidents, and to provide users with the convenience of hands-free communication while driving or performing other tasks, many companies are manufacturing, selling and promoting the use of headsets in connection with cellular phones and conventional landline telephones.

Currently, the majority of headsets on the market are designed to connect directly to a cellular phone or a conventional telephone (i.e. base units) via a wire. Although the wire provides for a secure connection to the base unit, the wire can be rather cumbersome. A wire connection between the headset and the base unit limits the mobility of a user, makes the storage of the phone system inconvenient and may cause the headset to be thrown from a person's head if the wire becomes caught on other objects, which can easily occur.

In response to the inconvenience of the headsets connected to a base unit via a wire, several companies have designed wireless headsets. Typically, wireless headsets are marketed and sold for use in connection with conventional landline telephones such as those found in the home or at the office. Only very recently have companies begun marketing and selling wireless headsets for use in connection with cellular telephones.

Although there are a wide-variety of headsets available on the market, all of the headsets, both wireless headsets and those having a wire, can typically be categorized into one of three general categories—ear bud headsets, on-the-ear headsets and over-the-head headsets. The first type, the ear bud headset, is most typically a headset having a wire connection to the base unit. The ear bud headsets have the speaker encased in a soft, flexible, generally cylindrically-shaped casing that is designed to be positioned in the opening of the auditory canal of a user's ear and held in place by the pressure of the casing against portions of the human ear, known as the tragus, concha and antitragus of the user's ear. To provide additional stability, and help prevent the ear bud from dislodging from a user's ear, ear bud headsets also often include an earpiece that extends around the exterior perimeter, or pinna, of a user's ear. These types of headsets are often uncomfortable, easily dislodged from the ear and difficult to secure into the ear. Further, when used in connection with earpieces, these types of headsets often require the use of two hands to secure the headset against the ear. In an automobile, for example, securing a headset with two hands can cause significant distraction and danger to a driver, as well as to nearby cars and pedestrians.

On-the-ear headsets are offered as one alternative to ear bud headsets. On-the-ear headsets (also sometimes referred to as over-the-ear headsets) are those headsets having speakers that rest on the exterior of the ear just opposite the auditory canal. The speakers are generally held against the ear via an earpiece that extends from the speaker and wraps over and around the perimeter, or pinna, of the user's ear. These types of headsets, while eliminating the discomfort caused through the use of ear buds, can be extremely difficult to secure onto a user's ear. Such headsets typically require the use of two hands to place the earpiece around the perimeter of the ear to secure the headset. Again, the dangers associated with driving and two-handed headsets also exist here with the on-the-ear headset.

Another alternative to both the ear bud and on-the-ear headsets are the headsets commonly known as over-the-head headsets. These headsets typically utilize speakers that rest on the ear in a position opposite the auditory canal, similar to the over-the-ear headsets, but have a head band extending therefrom that wraps at least partially over the user's head. One disadvantage to this type of headset is that the headset is generally large and bulky in comparison to the other headsets and thereby more difficult to store. Another disadvantage, which is actually a common disadvantage to many of the headsets, is that the headset cannot be used on either ear without first manipulating the headset by rotating the mouthpiece, or in other designs, by rotating the speaker, 180 degrees. This type of headset also requires two hands to secure around the head.

Of these three general styles, the most popular style used in connection with wireless headsets is the over-the-head headset because wireless headsets, unlike those with wire connections, require a battery pack and electronics disposed on the headset. Over-the-head headsets provide more options for the placement of the battery pack and the electronics because over-the-head headsets are generally more bulky than the other types of headsets and cover a larger surface area.

A need therefore exists for a wireless headset that avoids the disadvantages of the headsets described above.

SUMMARY OF THE INVENTION

The present invention provides a headset for use in connection with mobile phones, conventional landline telephones or personal computers. When used in a wireless application, the headset of the present invention is used in connection with a base and includes, among other things, a speaker, a battery pack, a microphone, and a transceiver.

The headset of the present invention comprises an elongated, casing to be secured to a person's head. Both the speaker and the battery pack extend from the casing generally parallel to one another and act in conjunction with one another to secure the headset against the user's ear. The microphone is located within the casing at the end opposing the battery pack. The transceiver electronically connects the speaker, the microphone and the battery pack to permit communication between the headset and the base unit.

In other embodiments of the present the invention, the headset can also operate as a telephone through the inclusion of dialing capabilities, or can be embodied in a headset having a wire by replacing the battery pack with an ear piece that acts in conjunction with the speaker to secure the headset against a user's ear.

BRIEF DESCRIPTION OF THE DRAWINGS

A more complete appreciation of the invention and many of the advantages thereof will be readily obtained as the same becomes better understood by references to the detailed description when considered in connection with the accompanying drawings, wherein.

DETAILED DESCRIPTION OF THE PREFERRED EMBODIMENT

Figure 1:
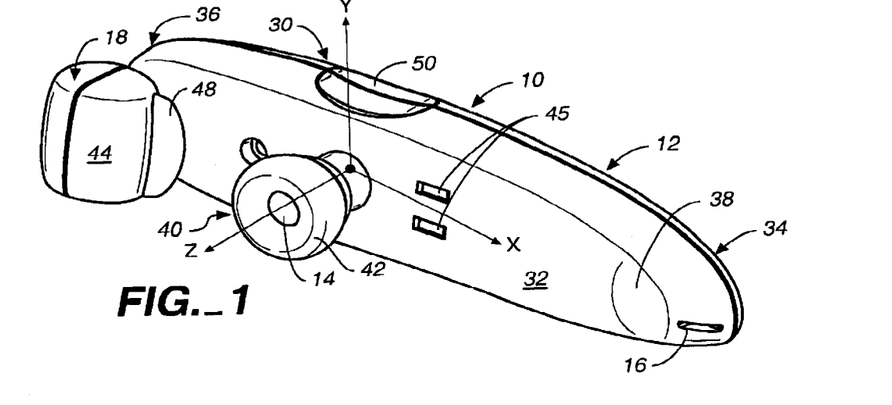
FIG. 1 is a side perspective view of the inner side of one embodiment of the headset of the present invention.

Turning now to the detailed drawings, FIG. 1 is a side perspective view of the inner side 32 of one embodiment of the headset 10 of the present invention. As seen in FIG. 1, the headset 10, when designed for use in a wireless application, includes a headset casing 12, speaker 14, a microphone 16, and a battery pack 18.

As seen in FIG. 1, the headset casing 12 is an elongated, generally flat hollow casing that is curved to follow the general contour of a person's head from their ear to their mouth. The headset casing 12 has two distinct sides, an outer side 30 and an inner side 32. When the headset 10 is in its operating position, i.e., when the speaker 14 is secured against a user's ear and the microphone 16 is directed toward the user's mouth, the outer side 30 is positioned away from the user's head and the inner side 32 faces toward the user. In one embodiment of the present invention, the headset casing 12 is made of plastic and can be formed from any number of plastic, metal, metal alloys, rubber or other material connected to one another or molded from one piece to create the configuration of the headset casing 12. The headset casing 12 may also be made or molded from other materials generally known in the art for manufacturing headsets 10 and other telecommunication devices.

The headset casing 12 further has two ends—a first end 34 and a second end 36. The first end 34 of the headset casing 12 tapers downward, creating a generally narrow rounded end that forms the mouthpiece 38 of the headset 10. A microphone 16 is placed therein, or may be positioned to extend therefrom. It is well understood that the ends defined in this embodiment may be interchangeable in other embodiments as long as the microphone 16 is near the user's mouth and the other end is near the user's ear.

A battery pack 18 and speaker 14 extend near the second end 36 of the headset casing 12. As illustrated by FIG. 1, in one embodiment of the present invention, the speaker 14 is embodied as an ear bud 40 and extends from the inner side 32 of the headset casing 12 at the approximate upper third of the headset casing 12 near the second end 36. It is understood that the headset casing 12 may extend at differing locations from the headset 10 along the elongated casing 12.

The ear bud 40 generally comprises a speaker 14 having, in this embodiment, a relatively soft material 42, such as foam or gel, or any other suitable material, extending around or encasing the speaker 14 to protect the ear from direct contact with the speaker 14. Other embodiments need not have the material 42 or can have other mechanisms for securing the ear bud 40 within the ear or otherwise protect the ear. The soft material 42 further functions to secure the ear bud 40 within the opening of the auditory canal of a user's ear. Thus, the ear bud 40 is typically formed to fit snugly, but comfortably, within the opening of the auditory canal of a user's ear. As such, the foam or gel material 42 is generally a flexible resilient material 42 that compresses slightly during the positioning of the ear bud 40 in a user's ear and then expands to fit the contour of the opening of the user's ear canal to create a snug fit therein. In one embodiment, the soft material 42 may be removable from the speaker 14 to allow for a user to place soft material 42 of different sizes and shapes on the speaker 14 to accommodate the different size or shape of a user's ear, relative to others' ears, and to promote comfort for the user.

Extending near the second end 36 of the headset casing 12 from the inner side 32 and in the same direction as the ear bud 40 is a battery pack 18. In one embodiment of the invention, the battery pack 18 includes a battery compartment 44 and a rechargeable battery (not shown) positioned within the compartment 44. The battery used in one embodiment of the present invention is a rechargeable battery of a type and chemistry generally known in the art, e.g., any lithium ion battery or the like. The headset can include contacts 45, as illustrated in FIG. 1, for engaging a charging device (not shown), which can be part of the base unit 60 (illustrated in FIGS. 9 and 10) to recharge the battery while contained in the battery compartment 44. The battery pack 18 can be designed such that it can be removed from the headset casing 12 and recharged separate from the headset 10. Alternatively, the battery pack 18 may be permanently affixed to the headset casing 12 such that the headset 10 remains with the battery pack 18 during charging. In yet another embodiment, the battery compartment 44 can be designed to contain a disposable battery or batteries. In that instance, the battery compartment 44 would be designed to easily open and allow users to change the battery, or batteries, as the case may be, when the battery or batteries lose their charge.

The battery pack 18 is positioned distally of the ear bud 40 such that the battery pack 18 can be located just behind a user's ear when the headset 10 is in its operating position. The battery pack 18 further has a lip 48 extending therefrom that extends parallel to the headset casing 12 and toward the ear bud 40. This lip 48 is positioned to engage the pinna, or more particularly, the helix of one's ear, and secure the pinna of the ear within the lip 44 of the battery pack 18, the battery pack 18 itself and the casing 12 when the headset 10 is in its operating position. Much like the headset casing 12, the lip 48 is may be composed of a variety of plastic, metal, metal alloys, rubber or other solid materials.

The battery pack 18 and the ear bud 40 are further positioned along the headset casing 12 such that the battery pack 18 can counterbalance the end 34 of the headset casing 12. In this way, the battery pack 18 may equally distribute the weight of the headset 10 between the ends of the headset casing 12 opposite the ear bud 40 about a z-axis (see FIG. 1) coming out of the ear bud 40. Thus, the rotation of the headset 10 about the ear bud 40 is minimized by having the weight of the headset 10 equally distributed on each side of the ear bud 40. Still in FIG. 1, two opposing indentations 50 (only one side is viewed) are located on casing 12. As more fully discussed in FIG. 3 below, the opposing indentations 50 are used to grip the headset 10 with a single hand, while simultaneously locating the speaker 14 for placing the speaker in the ear with a single hand as discussed in more detail below.

Figure 2:
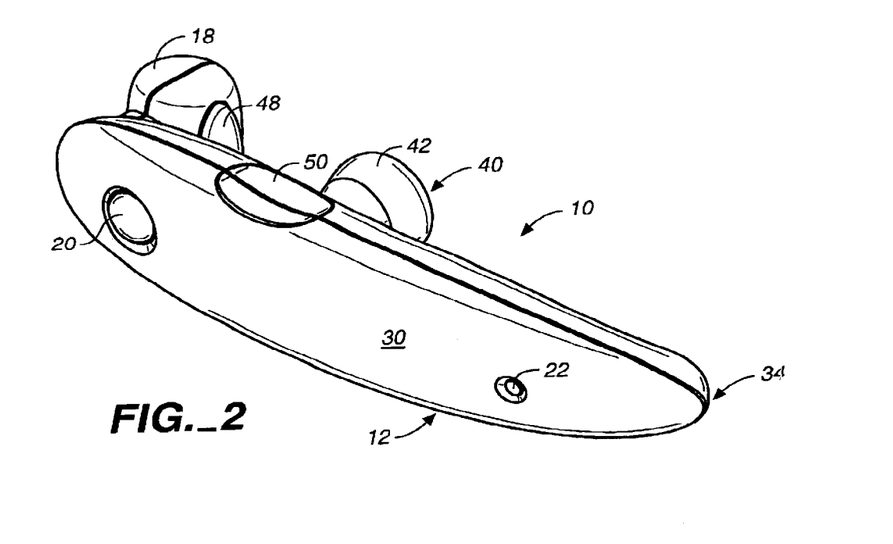
FIG. 2 is a side perspective view of the outer side of one embodiment of the headset of the present invention.

FIG. 2 is a side perspective view of the outer side 30 of one embodiment of the wireless headset 10 of the present invention. As seen best in FIG. 2, the outer side 30 of the headset casing 12 has two openings, which in the illustrated embodiment are positioned at opposing ends of the outer side 30 of the housing 12. Extending through one opening is a power button 20 for controlling the operation of the headset 10. The power button 20 may, among other things, allow a user to turn the headset 10 on and off and allow a user to answer the phone through the headset 10, without having to go to the base unit 60 (illustrated in FIGS. 9 and 10). Extending through the other opening is a light-emitting diode ("LED") 22 used to indicate when different functions of the headset 10 are engaged. The LED 22 can be a single, dual or tri-color LED 22 and can be used to indicate at least any one or any combination of the following: (1) when the headset 10 is powered on/off, (2) when the phone is ringing, or (3) when the phone is on hold, mute or on/off the hook. LED's 22 are well-known electrical devices that can be illuminated in different colors depending upon the value of the voltage and/or current applied to the LED 22.

Although not shown, the headset 10 of the present invention may also include a channel button for selecting one of a plurality of communications channels over which signals are transmitted between the headset 10 and the base unit 60. Further, the headset 10 may include volume controls for adjusting the volume of the ring, the volume of the speaker 14 (FIG. 1) as well as the volume of the microphone 16 (FIG. 1).

Figure 3:
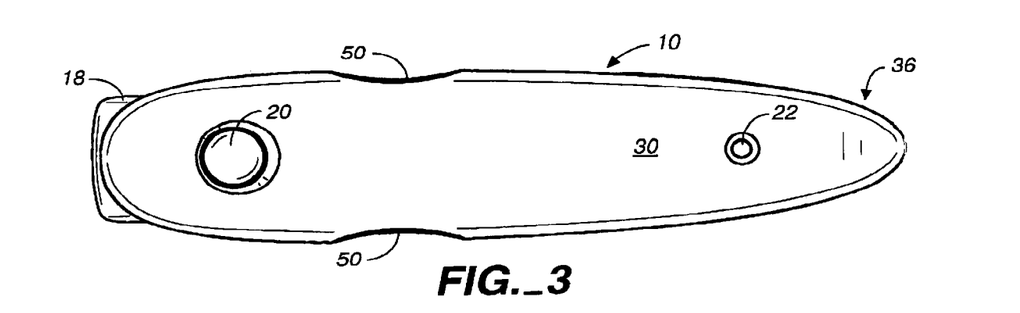
FIG. 3 is an outer side view of one embodiment of the headset of the present invention.
Figure 5:
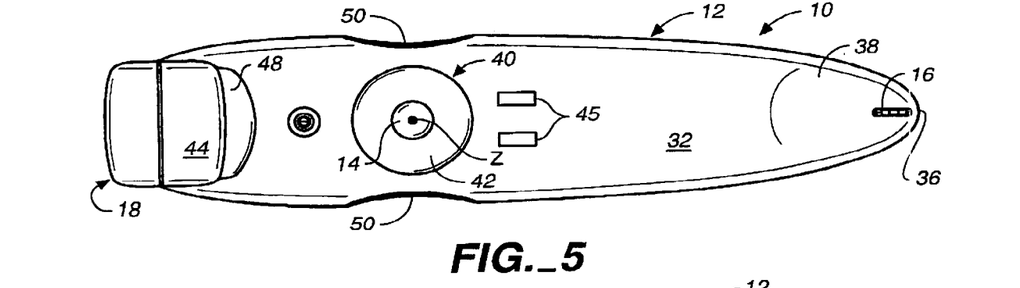
FIG. 5 is an inner side view of one embodiment of the headset of the present invention.

FIG. 3 is a view of the outer side 30 of one embodiment of the headset 10 of the present invention. As illustrated by FIG. 3, the headset casing 12 further includes two opposing indentations 50 located on the casing 12. As illustrated by FIG. 5, which is a view of the inner side 32 of one embodiment of the headset 10 of the present invention, the first indention 50 is located on the headset casing 12 above the ear bud 40 and the second indention 50 is located on the headset casing 12 just below the ear bud 40 opposite the first indention 50. These opposing indentations 50 allow the user to grip the headset 10 with his or her index finger (or, alternatively other fingers) and thumb, pinching the headset 10 therebetween.

Further, these indentations 50 serve as reference points that permit the user to reference the location of the speaker 14 along the elongated casing 12. By providing these reference points, a user is capable of aligning the speaker 14 with a user's ear in a simple and efficient manner. Thus, rather than having to use one's fingers for locating the speaker 14 location along the casing 12, a user need only place his/her fingers of the reference points to know the location of the speaker 14. The process of placing the speaker 14 in the ear is thereby simplified since the speaker 14 is located directly between the reference points. While the figures illustrate these reference points as indentations 50, the reference points may be simply denoted by using a different texture at that point along the headset casing 12, or by overlaying or inlaying a different material, such as rubber or other material having a contrasting feel from that of the headset casing 12, at the point along the headset casing 12 that permits the user to reference the location of the speaker 14 or ear bud 40.

Figure 4:
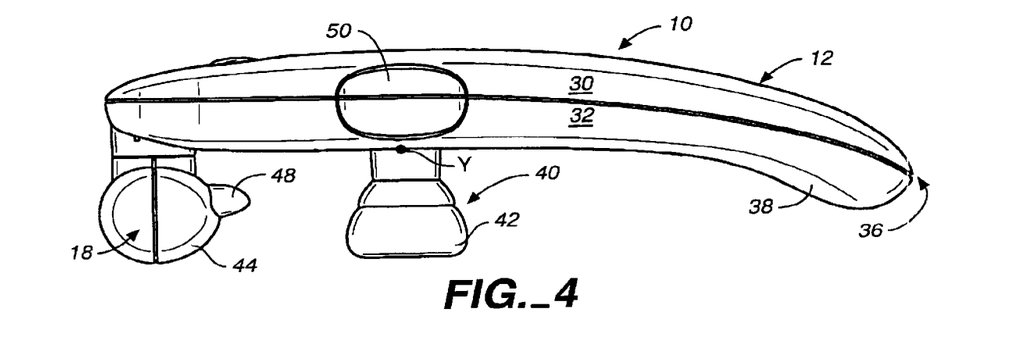
FIG. 4 is a plan view of one embodiment of the headset of the present invention.

FIG. 4 is a plan view of one embodiment of the headset 10 of the present invention and illustrates the lip 48 of the battery pack 18 relative to the ear bud 40. As seen in FIG. 4, the lip 48 extends from the battery pack 18, parallel with the headset casing 12, toward the ear bud 40. The lip 48 extends away from the battery pack 18 at a point that allows for enough space between the lip 48 and the inner side 32 of the headset casing 12 to engage the pinna, or more particularly, the helix of one's ear therebetween when the headset 10 is in its operating position. While the lip 48 can be made of the same material as the casing 12, in one embodiment, the lip 48 is made of a material, such as rubber, which will create more friction against the user's ear than the material of the headset casing 12, thereby further decreasing the likelihood of movement of the headset 10 relative to a user's ear when in use. In one embodiment of the present invention, the lip 48 may be removable from the battery pack 18 so that lips 48 of different shapes, sizes, angles and materials may be used in connection with the battery pack 18. By providing for a removable/replaceable lip 48, a user may select a lip 48 design that is most comfortable for the user.

Similarly, the battery pack 18 may be removed from the headset casing 12 so that different battery pack 18 designs may be used in connection with the headset casing 12 to accommodate the different sizes and shapes of users' ears to allow for the fit of the headset 10 to be modified for the comfort of each user.

Figure 6:
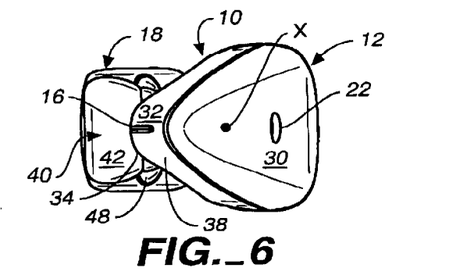
FIG. 6 is a front view of one embodiment of the headset of the present invention.

FIG. 6 is a front view of one embodiment of the headset 10 of the present invention and illustrates the alignment of the battery pack 18 with the ear bud 40 and the positioning of the mouthpiece 38 and microphone 16 at the first end 34 of the casing 12.

Figure 7:
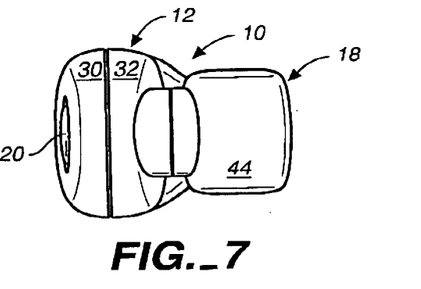
FIG. 7 is a rear view of one embodiment of a headset of the present invention.

FIG. 7 is a rear view of one embodiment of the headset 10 of the present invention, which illustrates the battery pack 18 extending from the headset casing 12 and the power button 20 located generally opposite the battery pack 18.

Figure 8:
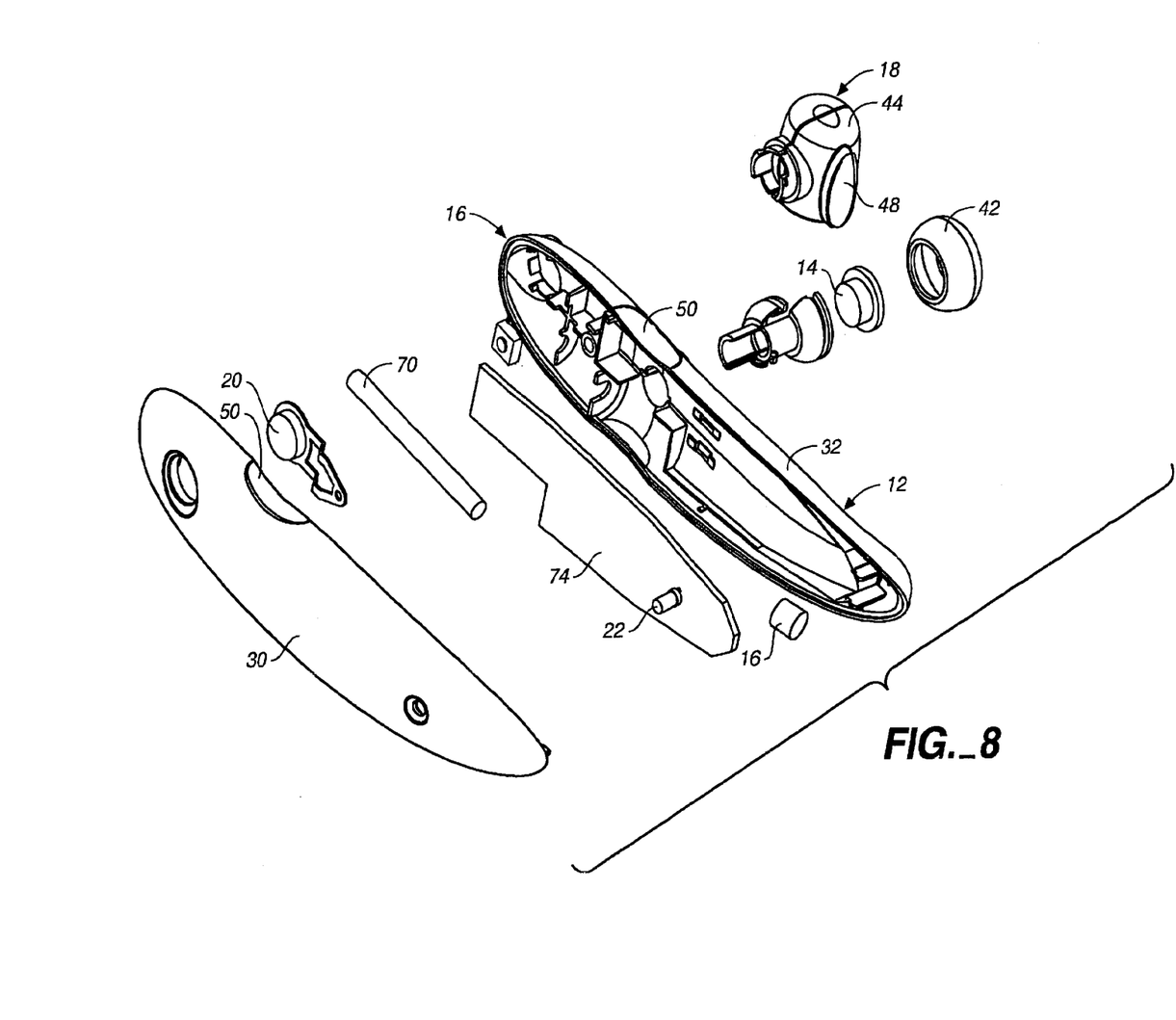
FIG. 8 is an exploded view of one embodiment of a headset of the present invention.

FIG. 8 is an exploded view of one embodiment of the wireless headset 10 of the present invention and illustrates the component parts of the headset 10 contained within the headset casing 12, such as the transmitter and receiver (not shown) or transceiver (not shown). As seen in FIG. 8, within the headset casing 12 there is an antenna 70 and a transceiver. A logic circuit 74 is connected to and controls all the elements within the headset 10, including the transceiver, the antenna 70, the speaker 14, the microphone 16 and the battery (not shown). The circuit 74 is also connected to and controls the power button 20, the LED 22 and any volume controls or channel select switch, all of which may be options on the headset 10. Further, in one embodiment of the headset 10 the circuit 74 is positioned within the casing 12 such that it counterbalances the weight of the battery pack 18 and ear bud 40 about the inner side 32 of the headset 10, thereby minimizing rotation of the headset about the x-axis (see FIG. 1). Further, the components of the headset 10 are positioned relative to one another and weighted such that they not only counterbalance one another along the z-axis as discussed above, but also along the y-axis (see FIG. 1) to create a center of gravity of the headset 10 at the point in which the x, y and z-axes intersect, as illustrated by FIG. 1.

Figure 9:
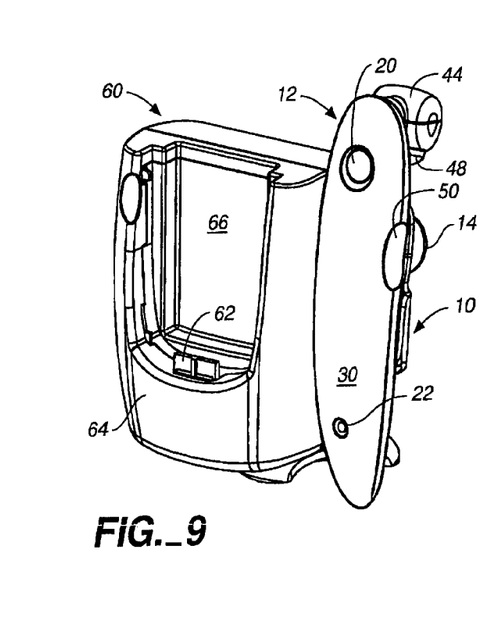
FIG. 9 is a front perspective view of one embodiment of a base for use in connection with a headset, the base having a headset resting thereon.
Figure 10:
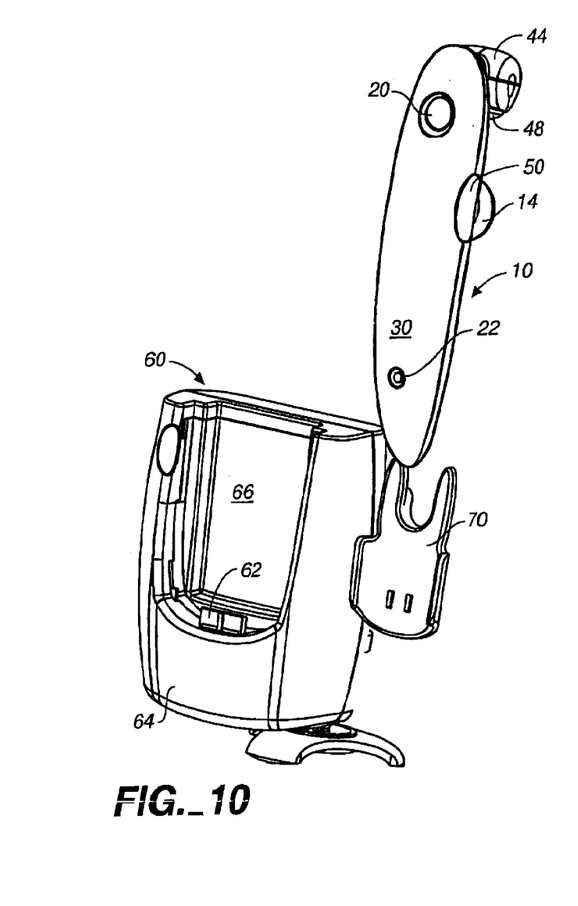
FIG. 10 is a front perspective view of one embodiment of a base for use in connection with a headset, depicting the headset being removed from the base.

FIGS. 9 and 10 illustrate one embodiment of a base unit 60 that can be used in connection with the headset 10 of the present invention. The headset 10 is designed to communicate with a base unit 60 through the use of antenna 70 (see FIG. 8) and a transceiver (not shown) that are contained within the headset casing 12. The base unit 60 has a phone interface 62 for electronically coupling the base unit 60 to a mobile phone (not shown) to allow the base unit 60 to communicate with the mobile phone. The base unit 60 can be a standard base unit 60 of any known type. The base 60 unit can be a stand-alone unit or can be attached to or incorporated in a landline telephone or a mobile phone. Alternatively, the base unit 60 can be incorporated into, or affixed on, a cellular telephone or a conventional landline telephone. The base unit 60 used in connection with the present invention, and operation thereof in connection with wireless headset 10, is of the type generally known in that art.

FIG. 9 is a front perspective view of one embodiment of a base unit 60 having the headset resting thereon. In one embodiment, the phone interface 62 is positioned at the base of a first cradle 66 for holding a mobile phone against the base unit 60. Power can be provided to the base unit 60 through either a rechargeable battery or an external power source.

FIG. 10 is a front perspective view of one embodiment of a base unit 60 showing the headset 10 removed from the base unit 60. As illustrated by FIG. 10, in one embodiment, the base unit includes a second cradle 70 for securing the headset 10 against the base unit 60 when the headset 10 is not in use.

Figures 11, 13:
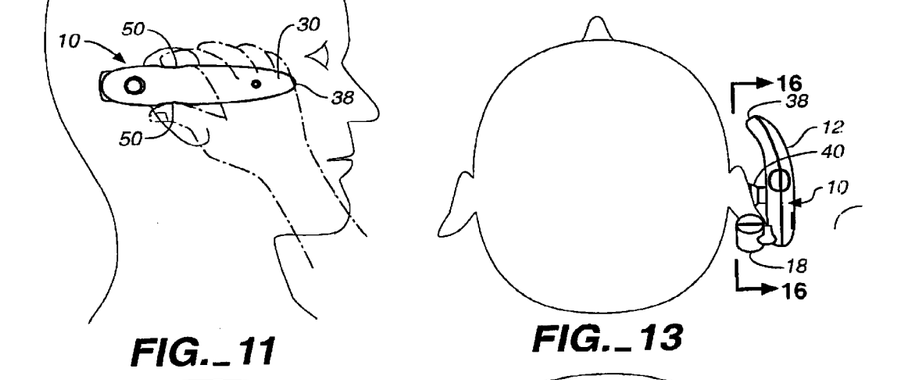
FIG. 11 is side view of an embodiment of the headset of the present invention depicting a step of securing a headset against a user's ear.
FIG. 13 is top view of an embodiment of the headset of the present invention depicting the further step of securing a headset against a user's ear, as illustrated in FIG. 12.
Figure 11A:
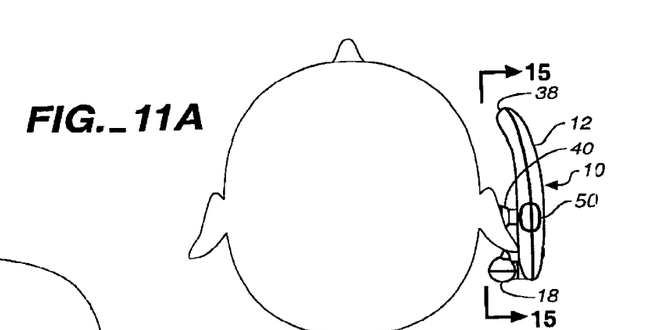
FIG. 11A is a top view of an embodiment of the headset of the present invention depicting the securing a headset against a user's ear, as illustrated by FIG. 11.
Figure 12:
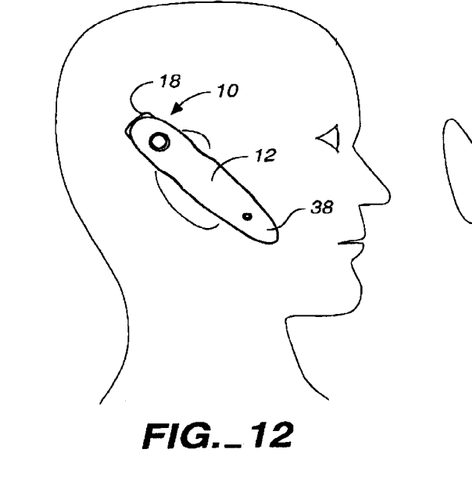
FIG. 12 is side view of an embodiment of the headset of the present invention depicting a further step of securing a headset against a user's ear.

In operation, the user first secures the headset against one's ear. As illustrated by FIGS. 11 & 11A, which depict a step of securing one embodiment of the headset against a user's ear, to place the headset 10 against one's ear, the user grasps the indentations 50 of the headset 10 and positions the ear bud 40 (see FIG. 1) in the opening of his or her auditory canal with the mouthpiece 38 of the headset 10 pointed away from the user's mouth such that the headset, when the user is in a vertical position, is generally horizontal to the ground. Then, as illustrated by FIG. 12, which depicts a further step of securing one embodiment of the headset against a user's ear, the user then rotates the headset 10 about the user's ear such that mouthpiece 38 is rotated forward and upward toward the operating position such that the headset is at a generally 45 degree angle to the floor when the user is in the vertical position. Simultaneously therewith, as the headset 10 is being rotated, the lip 48 (see FIG. 1) of the battery pack 18 catches the backside of the pinna, or the helix of the user's ear, and is rotated toward the rear of the user's head securing the pinna between the lip 48 of the battery pack 18, the battery pack 18 and the headset casing 12. To remove the headset 10, the user simply rotates the mouthpiece 38 of the headset 10 in the opposing direction, positioning the mouthpiece downward and away from the user's mouth.

Figure 14:
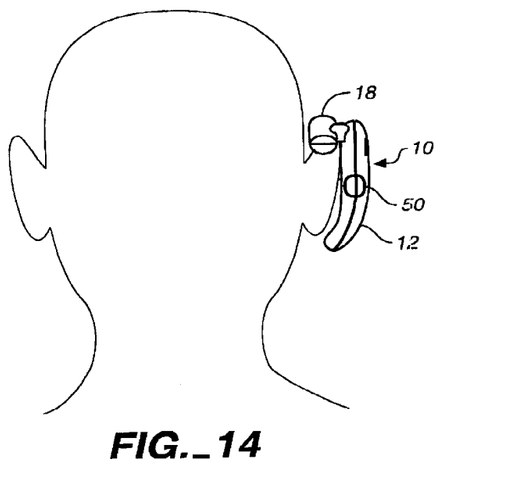
FIG. 14 is rear view of an embodiment of the headset of the present invention depicting the further step of securing a headset against a user's ear, as illustrated in FIG. 12.

FIG. 13 is top view of an embodiment of the headset 10 of the present invention depicting the headset 10 against one's ear as it would appear when the headset 10 has been positioned in its operating position. Similarly, FIG. 14 is rear view of an embodiment of the headset 10 of the present invention also depicting the headset 10 against one's ear as it would appear when the headset 10 has been positioned in its operating position.

Figure 15:
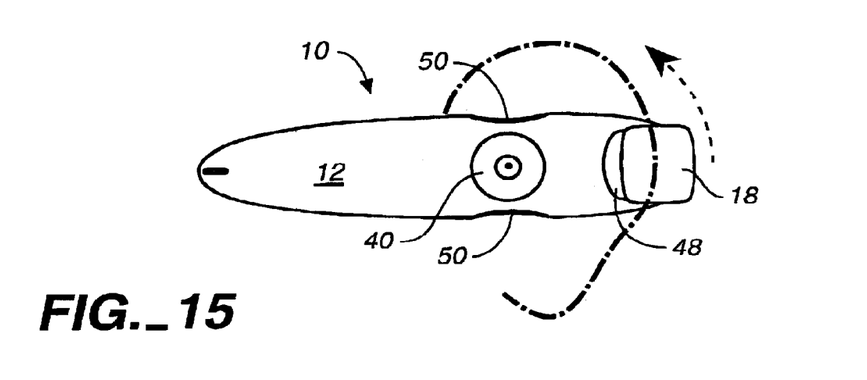
FIG. 15 is a side view from within a user's ear depicting a step of securing a headset against a user's ear.
Figure 16:
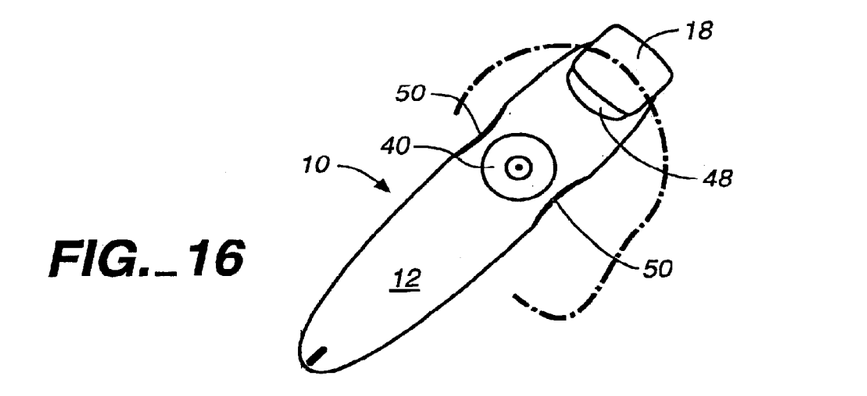
FIG. 16 is a side view from within a user's ear depicting a further step of securing a headset against a user's ear.

Like, FIG. 11, FIG. 15 also illustrates a step of securing one embodiment of the headset against a user's ear. FIG. 15, however, illustrates this step viewed from within a user's ear and depicts the general positioning of the headset 10 when a user initially places the headset 10 against one's ear by grasping the indentations 50 of the headset 10 and positioning the ear bud 40 in the opening of his or her auditory canal. Similarly, like FIG. 12, FIG. 16 also illustrates a further step of securing one embodiment of the headset against a user's ear. FIG. 16 also illustrates this step viewed from within a user's ear and depicts the general positioning of the headset 10 when a user has placed the headset 10 in its operating positioning. In particular, FIGS. 15 and 16 illustrate the headset catching the backside of the pinna, or the helix of the user's ear, as the headset is rotated toward the rear of the user's head securing the pinna between the lip 48 of the battery pack 18, the battery pack 18 and the headset casing 12.

To receive an incoming call, the user would power the headset 10 on by actuating the appropriate button on the headset 10, such as the power, or on/off button 20. Alternatively, the base unit 60 may automatically turn the headset 10 on upon the receipt of a call. The wireless headset 10 and base unit 60 communicate with one another, for example, through a magnetic inductive coupling or other method commonly known in the art. The base unit 60 then converts the signals from the mobile phone into signals that the wireless headset 10 can utilize and conversely, the base unit 60 converts the signals received from the wireless headset 10 into signals that the mobile phone can utilize, the base unit 60 having a transceiver (not shown) for communicating with the transceiver 72 of the headset 10.

Although the headset 10 of the present invention is described generally as a "wireless" headset, the headset 10 of the present invention may also be easily adapted, in alternative embodiments, to a headset 10 having a wire that connects directly to a telephone, such as a cellular or wireless telephone, or a conventional landline telephone or even a personal computer. Because a headset 10 having a wire connection would not need a battery, the embodiment of the headset 10 having the wire connection would be absent a battery compartment 44. Instead, the headset 10 having a wire could have an ear piece (not shown), configured similarly to the battery compartment 44 of the wireless embodiment of the headset 10, having a lip 48 or generally L-shaped design to engage the helix of one's ear, and secure the helix of the ear between the ear piece and the headset casing 12 when the headset 10 is in its operating position. Similar to the battery compartment 44 of the wireless headset 10, the ear piece of the headset 10 having the wire could be weight integrated to counterbalance the end 34 of the casing 12 opposite the ear bud 40 or speaker 14 to equally distribute the weight of the headset 10 on each side of the ear bud, thereby preventing the unnecessary rotation of the ear bud 40 due to one side of the headset being more heavily weighted than the other. Unlike the wireless headset 10, the headset 10 of this embodiment would not require a base unit 60 or the wireless communication components. The headset 10 utilizing a wire would communicate directly with the telephone via wire connectivity and would be secured against the user's head in a similar manner to the wireless headset 10.

It will be understood that the above-described arrangements of apparatus and the method therefrom are merely illustrative of applications of the principles of this invention and many other embodiments and modifications may be made without departing from the spirit and scope of the invention as defined in the claims.

What is claimed is:

1. A wireless headset for communicating with a base, the headset to be secured against a user's ear, the headset comprising:
    an elongated casing having an inner surface, an outer surface, a first end and a second end, said inner surface facing the user and said outer surface being generally parallel to said inner surface;
    a speaker extending substantially perpendicularly from said inner surface of the elongated casing for positioning of said speaker within an ear canal opening of said user;
    a microphone positioned at the first end of the elongated casing;
    a battery pack extending from the second end of the elongated casing generally parallel to the speaker, the battery pack designed to act in conjunction with the speaker to secure the headset against the user's ear; and
    a transceiver within the elongated casing and electronically connected to the speaker, the microphone and the battery pack for permitting communication between the headset and the base.

2. The wireless headset recited in claim 1, wherein the battery pack has a lip extending therefrom for engaging the user's ear between the lip and the elongated casing, the battery pack extending from the elongated casing at a distance from the speaker such that the lip engages an exterior of the user's ear when the speaker is positioned within an the ear canal opening of the user's ear.

3. The wireless headset recited in claim 1, further comprising at least one reference point on the casing and laterally aligned with the speaker, the at least one reference point permitting the user to reference the location of the speaker along the elongated casing as the reference point and the speaker are substantially at a same distance from said first and second ends.

4. The wireless headset recited in claim 3, wherein the reference point includes two opposing indentations in lateral alignment with the speaker and with each other.

5. The wireless headset recited in claim 1, wherein said battery pack further comprises a rechargeable battery.

6. The wireless headset recited in claim 1, wherein the battery pack is removably attached to the elongated casing.

7. The wireless headset recited in claim 1, wherein the weight of the headset is equally distributed on each side of the speaker to prevent the unnecessary rotation of the headset about the speaker.

8. The wireless headset recited in claim 1, further comprising an ear bud that incorporates the speaker therein.

9. The wireless headset recited in claim 1, further comprising a power button for controlling the operation of the headset.

10. A wireless headset for communicating with a base, the headset to be secured against a user's ear, the headset comprising:
    an elongated casing having a first end and a second end;
    a speaker extending from an inner surface of the elongated casing for insertion of said speaker within an ear canal opening of said user;
    a microphone positioned at the first end of the elongated casing;
    a battery pack extending generally parallel with the speaker from the second end of the elongated casing, and positioned relative to the speaker such that the weight of the elongated casing is equally distributed on each side of the speaker to prevent the unnecessary rotation of the headset about the speaker, said battery pack, when the speaker is inserted within the ear canal opening of the user's ear, remaining above said user's ear canal opening; and
    a transceiver within the elongated casing and electronically connected to the speaker, the microphone and the battery pack for permitting communication between the headset and the base.

11. The wireless headset recited in claim 10, further comprising an ear bud that incorporates the speaker therein.

12. The wireless headset recited in claim 10, wherein the battery pack is designed to engage the pinna of the user's ear.

13. The wireless headset recited in claim 12, wherein the battery pack is designed to act in conjunction with the speaker to secure the headset against the user's ear.

14. The wireless headset recited in claim 12, wherein the battery pack has a lip extending therefrom substantially parallel to said inner surface of said elongated casing for engaging the user's ear between the lip and said inner surface.

15. The wireless headset recited in claim 10, further comprising at least one reference point on the casing laterally aligned with the speaker, the at least one reference point permitting the user to reference the location of the speaker along the elongated casing.

16. The wireless headset recited in claim 15, wherein the reference point includes two opposing indentations in lateral alignment with the speaker and with each other.

17. The wireless headset recited in claim 10, wherein said battery pack further comprises a rechargeable battery.

18. The wireless headset recited in claim 10, further comprising a power button for controlling the operation of the headset.

19. A wireless headset for communicating with a base, the headset to be secured against a user's ear having an ear canal opening, the headset comprising:
    an elongated generally pontoon-shaped casing;
    an ear bud extending substantially perpendicularly from an inner surface of the elongated casing having a speaker incorporated therein, said ear bud for positioning of said speaker within an ear canal opening of said user;
    a battery pack with a compact, generally barrel-shaped body extending from one end of the elongated casing and generally parallel to the ear bud, the battery pack having a lip extending therefrom for engaging the user's ear between the lip and the casing, the battery pack positioned at said one end of the elongated casing at a distance from the ear bud such that when the ear bud is positioned within the ear canal opening of the user's ear, the lip engages an exterior of the user's ear and the body of the battery pack remains above said ear canal opening;

a microphone positioned within the elongated casing; and a transceiver within the elongated casing and electronically connected to the speaker, the microphone and the battery pack for permitting communication between the headset and the base.

20. The wireless headset recited in claim 19, further comprising at least one reference point on the casing and laterally aligned with the ear bud, the at least one reference point permitting the user to reference the location of the ear bud along the elongated casing.

21. The wireless headset recited in claim 20, wherein the reference point includes two opposing indentations in lateral alignment with the ear bud.

22. The wireless headset recited in claim 19, wherein said battery pack further comprises a rechargeable battery.

23. The wireless headset recited in claim 19, wherein the battery pack is removably attached to the elongated casing.

24. The wireless headset recited in claim 19, wherein the weight of the headset is equally distributed on each side of the speaker to prevent the unnecessary rotation of the headset about the speaker.

25. A wireless headset for communicating with a base, the headset to be secured against a user's ear, the headset comprising:

an elongated casing having an inner surface facing the user's ear and an outer surface that is generally parallel to said inner surface;

an ear bud with a speaker extending from the inner surface of the elongated casing;

a battery pack extending from one end of the elongated casing generally parallel to with the speaker, the battery pack having a lip extending substantially parallel with said inner surface designed to act in conjunction with the speaker ear bud, in an absence of any additional securing mechanism, to secure the headset against the user's ear; and a microphone within the elongated casing;

a first transceiver within the elongated casing and electronically connected to the speaker, the microphone and the battery pack for permitting communication between the headset and the base; and a base station having an interface for receiving electrical power, an interface for electronically coupling a telephone with the base station to permit the base station to communicate with the telephone and a second transceiver for permitting communication with the first transceiver of the headset.

26. A headset for communicating with a telephone, the headset to be secured against a user's ear, the user's ear having an ear canal opening, the headset comprising:

an elongated casing;

a speaker extending substantially perpendicularly from the elongated casing;

an ear piece assembly extending from one end of the elongated casing generally parallel to the speaker, the ear piece assembly having a lip extending therefrom for engaging the user's ear between the lip and the elongated casing, the ear piece assembly extending from the elongated casing at a distance from the speaker such that the lip of the ear piece assembly can engage the user's ear when the speaker is positioned near the ear canal opening of the user's ear, said ear piece assembly, when the sneaker is positioned within the ear canal opening of the user's ear, remaining above said user's ear canal opening;

a microphone within the casing; and a device for electronically coupling the headset with the telephone to allow for communication between the headset and the telephone.

27. A headset for communicating with a telephone, the headset to be secured against a user's ear, the headset comprising:

an elongated casing;

a speaker extending outwardly from an inner surface of the elongated casing, said elongated casing further including at least one reference point positioned on a side surface of the casing generally in lateral alignment with the speaker to permit the user to reference the location of the speaker along the elongated body casing as being immediately adjacent said reference point;

an ear piece assembly extending outwardly from the inner surface of one end of the elongated casing generally parallel to with the speaker, the ear piece assembly designed to act in conjunction with the extending speaker to secure the headset against the user's ear in an absence of any additional securing mechanism;

a microphone within the elongated casing; and a device for electronically coupling the headset with the telephone to permit communication between the headset and the telephone.

\* \* \* \* \*